(12) United States Patent
Braeuchle et al.

(10) Patent No.: US 7,672,769 B2
(45) Date of Patent: Mar. 2, 2010

(54) DEVICE FOR LONGITUDINAL GUIDANCE OF A MOTOR VEHICLE BY INTERVENTION IN THE BRAKE SYSTEM

(75) Inventors: Goetz Braeuchle, Reichartshausen (DE); Hermann Winner, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 741 days.

(21) Appl. No.: 10/566,917

(22) PCT Filed: Jul. 22, 2004

(86) PCT No.: PCT/DE2004/001607
§ 371 (c)(1),
(2), (4) Date: Aug. 21, 2006

(87) PCT Pub. No.: WO2005/014350
PCT Pub. Date: Feb. 17, 2005

(65) Prior Publication Data
US 2007/0192009 A1    Aug. 16, 2007

(30) Foreign Application Priority Data
Aug. 6, 2003  (DE) .................... 103 35 899

(51) Int. Cl.
*G06F 19/00* (2006.01)

(52) U.S. Cl. ................ 701/70; 701/78; 701/83; 701/93

(58) Field of Classification Search .............. 702/57, 702/60, 67, 117; 701/36, 70–83, 93–96, 701/301; 703/14, 18; 700/295, 297, 306; 340/435–437; 180/170–179
See application file for complete search history.

(56) References Cited

U.S. PATENT DOCUMENTS 7,089,101 B2 *   8/2006   Fischer et al. ............. 701/41
7,395,144 B2 *   7/2008   Isaji et al. ................. 701/70
7,433,771 B2 *  10/2008   Herges ..................... 701/70

FOREIGN PATENT DOCUMENTS

| DE | 100 47 048 | 4/2002 |
|----|------------|--------|
| EP | 1 061 495 | 12/2000 |
| JP | 6144169 | 5/1994 |
| JP | 11255089 | 9/1999 |
| JP | 2000355234 | 12/2000 |

* cited by examiner

Primary Examiner—Richard M. Camby
(74) Attorney, Agent, or Firm—Kenyon & Kenyon LLP

(57) ABSTRACT

A device for longitudinal guidance of a motor vehicle, including a driver assistance system which outputs a brake request signal to a brake control unit. The driver assistance system is designed to output a brake request signal in the form of a distance signal which specifies the distance to be traveled by the vehicle within which the vehicle is to reach a predefinable target velocity. The brake control unit has a conversion unit for converting the distance signal into a brake operation signal.

19 Claims, 2 Drawing Sheets

DEVICE FOR LONGITUDINAL GUIDANCE OF A MOTOR VEHICLE BY INTERVENTION IN THE BRAKE SYSTEM

FIELD OF THE INVENTION

The present invention relates to a device for longitudinal guidance of a motor vehicle, having a driver assistance system which outputs a brake request signal to a brake control device.

BACKGROUND INFORMATION

One example of such a device is an ACC (Adaptive Cruise Control) system which makes it possible to adjust the velocity of a vehicle to the velocity of a preceding vehicle, located with the help of a radar system, so that the preceding vehicle is followed at a suitable safety distance. To do so, the driver assistance system intervenes in the drive system and, if necessary, also intervenes in the brake system of the vehicle. The intervention in the brake system has conventionally been accomplished by regulating the braking deceleration to a setpoint braking deceleration calculated by the driver assistance system. When this regulation takes place in the brake control unit, the setpoint braking deceleration forms the brake request signal which is output by the driver assistance system.

ACC systems in use today are generally designed for travel at a high velocity, e.g., on a highway. However, there are efforts to expand the function range of such systems to low velocities and in particular to include a stop-and-go function in which the vehicle is automatically brakable to a standstill when the preceding vehicle stops, e.g., in a traffic jam. The problem occurring then is that inaccuracies during measuring of the actual braking deceleration have serious effects at low velocities, so that regulation becomes unstable. The nonsteady transition to a standstill (stopping jolt) is a particular problem here. In vehicles having an automatic transmission, the brake must also be operated at a standstill to prevent the vehicle from rolling. However, since the actual braking deceleration is equal to zero at a standstill, the brake request signal cannot be defined at a standstill via a setpoint braking deceleration.

These problems are avoidable or at least alleviatable if the brake request signal output by the driver assistance system is not represented by a setpoint braking deceleration but instead directly by a brake pressure signal. However, since the deceleration of the vehicle achieved with a given brake pressure depends on the particular vehicle model and the condition of the brakes (temperature, moisture), in this case the driver assistance system must be adjusted to the particular vehicle model and must also be able to process a plurality of parameters related to the condition of the brake system.

SUMMARY

An example embodiment of the present invention may have an advantage that the driver assistance system may be used in different vehicle models without any specific adjustments and nevertheless a precise control or regulation of the braking performance is made possible in particular in the lower velocity range. This may be achieved according to the present invention by the fact that the driver assistance system outputs a distance signal as the brake request signal, indicating within which path the vehicle should have reached a specified target velocity. For example, the content of the distance signal may thus be the requirement: "After a distance of x meters, the vehicle should have velocity y km/h" or in the case of a stopping procedure: "After a distance of x meters, the vehicle should be standing still." Implementation of this requirement is then the responsibility of the brake control unit.

This achieves the result that all regulation or control processes, which depend on the vehicle model, the condition of the vehicle and/or the condition of the vehicle brakes, are concentrated in the brake control system so that the driver assistance system may be used universally for various vehicle models without any particular adjustments. Since the brake control units, in particular when equipped with an ABS function, cooperate with a sensor system anyway, which detects relevant parameters such as wheel rotational speeds and wheel accelerations, and since the instantaneous conditions of use of the brakes are determinable on the basis of these sensor signals, in particular the roadway surface coefficient of friction and the relationship between the brake pressure and braking deceleration, the data needed for implementation of the brake request signal is directly available in the brake control unit.

On the basis of the known actual velocity of the vehicle, the brake control unit is capable of calculating the braking deceleration required for the target velocity to be achieved within the distance specified by the distance signal, and the brake pressure may then be controlled or regulated in such a way that the specifications of the brake request signal are met. Depending on the situation, the braking deceleration may be either controlled or regulated in the brake control unit. At very low velocities and in particular when braking to a standstill, control of the braking deceleration is preferably provided on the basis of the relationship between the brake pressure and braking deceleration known for the specific vehicle model and the prevailing operating state. The brake pressure required to keep the vehicle at a standstill is determined by the vehicle-specific brake control unit.

In one example embodiment, at least two interfaces are provided for communication between the driver assistance system and the brake control unit; one interface is the distance interface via which the brake request signal is output in the form of a distance signal, while another brake request signal, e.g., a setpoint braking deceleration or a brake pressure may optionally be output via the other interface. Thus, for example, in a situation in which a target velocity which is to be reached after a certain distance is not appropriate, there may be a change from the distance interface to another interface, e.g., a deceleration interface in the driver assistance system. An example which may be considered is the situation in which the preceding vehicle starts moving again before the host vehicle has come to a standstill. In this case, a brake request signal is output via the deceleration interface in the form of a setpoint braking deceleration in such a way that according to a certain time function there is a gradual reduction in braking deceleration and thus a gentle and comfortable transition from braking to accelerating.

It is expedient here if the brake control unit sends a message back to the driver assistance system regarding the actual deceleration. The time function for the setpoint braking deceleration may then be adjusted so that there is a jolt-free transition when there is a change in interface.

A feedback acknowledgment of the actual values, not only when using the deceleration interface but also when using the distance interface is also expedient to prevent the system from overreacting in cases when it is impossible to achieve the braking deceleration actually required on a smooth road surface, for example. According to the base value method, the brake request signal output by the driver assistance system is modified so that it deviates from the actual reported value by no more than a certain tolerance Δ. For example, if the stopping distance originally calculated by the driver assistance system and output as the brake request signal cannot be met on a smooth road surface, for example, then the setpoint stopping distance is lengthened so that it is only slightly greater than the stopping distance achievable under these road surface conditions. When there is subsequently a sudden change from a smooth section of road surface to a road surface having better traction, the setpoint/actual difference then amounts to Δ at most, and the braking deceleration is initially increased only moderately at first. The stopping distance is reduced again only when the driver assistance system is informed by the actual value reported back that a shorter stopping distance is now possible.

BRIEF DESCRIPTION OF THE DRAWINGS

An exemplary embodiment of the present invention is illustrated in the figures and explained in greater detail below.

DETAILED DESCRIPTION OF EXAMPLE EMBODIMENTS

Figure 1:
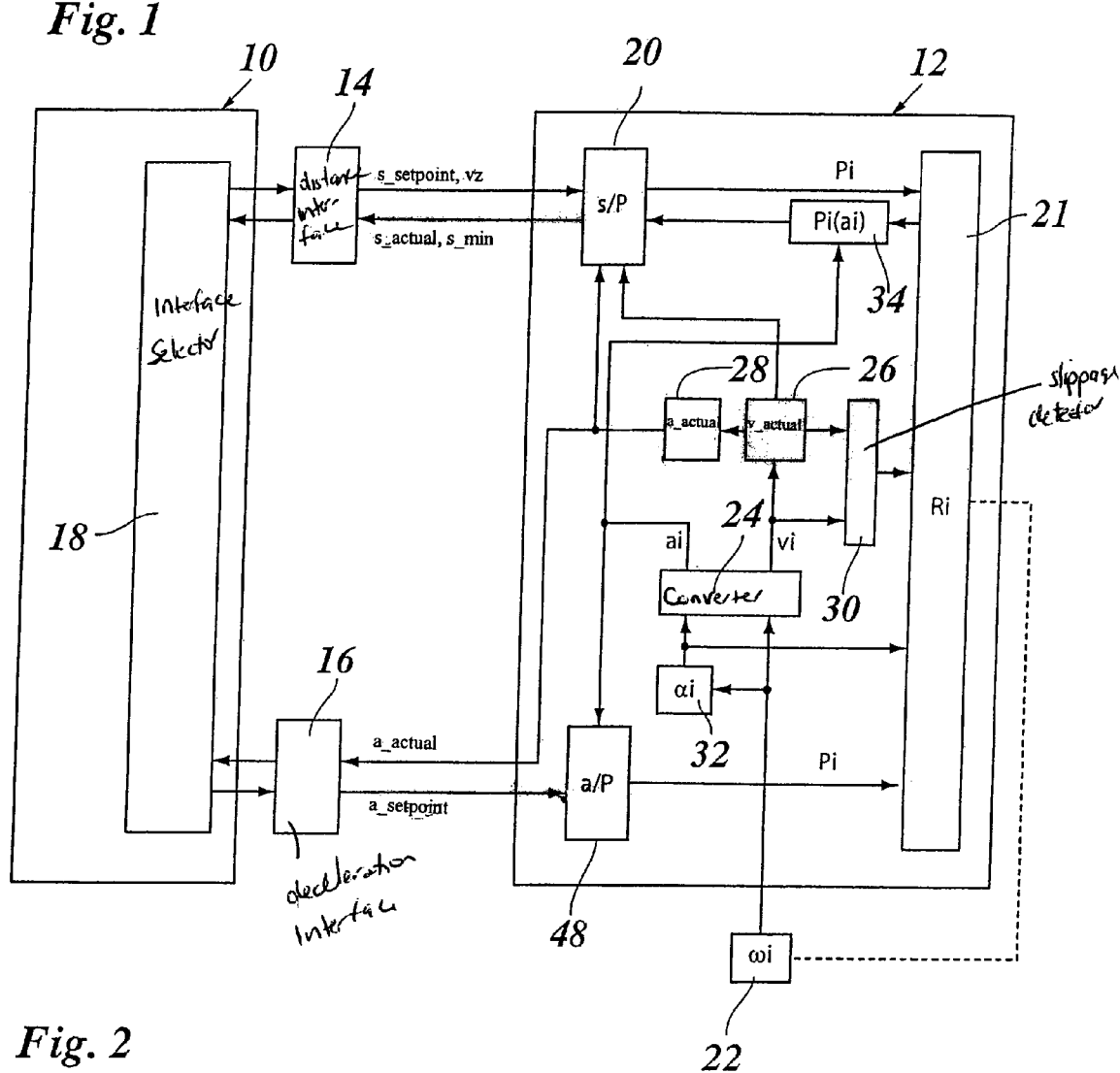
FIG. 1 shows a block diagram of an example device according to the present invention.

FIG. 1 shows a block diagram of a driver assistance system 10, e.g., an ACC system and a brake control unit 12 which communicate via a distance interface 14 and a deceleration interface 16. Driver assistance system 10 has an interface selector 18 which decides, depending on the situation, which of the two interfaces is to be used for the communication.

Driver assistance system 10 is able to output a brake request signal to the brake control unit 12 over each of the two interfaces and thereby prompt the brake control unit to operate the vehicle brakes. In the case of distance interface 12, the brake request signal is a distance signal s_setpoint, which is converted in a conversion unit 20 in brake control unit 12 into brake pressure signals Pi (i=1-4) for each of the four wheel brakes of the vehicle. Brake pressure signals Pi are forwarded to brake pressure regulator 21 (Ri), which are assigned to the four wheels of the vehicle and which produce the brake pressure buildup on the wheels.

In addition, a wheel tachometer 22 is assigned to each wheel to measure wheel rpm ωi of that particular wheel and send it to the brake control unit. In a converter 24, wheel rpm ωi is converted on the basis of the known wheel diameter into a wheel velocity vi, which represents the circumferential velocity of the wheel and thus also the actual velocity of the vehicle in the case of non-slip rolling. In braking operations, however, the slippage may result in wheel velocity vi being smaller than the vehicle velocity. In a selection block 26, vehicle velocity v_actual is therefore formed by selection of the maximum of four wheel velocities vi. If necessary, a correction may also be performed here for the different wheel velocities when negotiating turns. Vehicle velocity v_actual is relayed to conversion unit 20. A differentiating element 28 calculates actual braking deceleration (negative acceleration) a_actual from vehicle velocity v_actual and also reports this to conversion unit 20.

A slippage detector 30 compares wheel velocities vi with vehicle velocity v_actual and reports the slippage of each wheel to particular brake pressure regulator ri. A differentiating element 32 calculates particular angular accelerations αi of the wheels from measured wheel velocities ωi and also sends this information to brake pressure regulator ri. Brake pressure regulators ri are capable of performing an antislip regulation on the basis of the slippage and angular acceleration signals so that the braking force is uniformly distributed between the right and left sides of the vehicle and furthermore is divided appropriately between the front and rear wheels, depending on the axle load.

Converter 24 calculates associated wheel-brake decelerations ai, i.e., the time derivatives of the circumferential velocities of the wheels, from angular accelerations αi of the wheels. These wheel-brake decelerations ai are transmitted for each wheel to a monitoring block 34 which records a function Pi(ai) indicating the relationship between brake pressure and wheel-brake deceleration for the particular wheel and also the maximum brake pressure beyond which the wheel locks up. This function is made available to conversion unit 20.

Together with distance signal s_setpoint, a target velocity vz is also relayed via distance interface 14. Distance signal s_setpoint specifies the distance of the vehicle within which target velocity vz is to be achieved. In a stopping operation, vz is equal to zero and s_setpoint is the stopping distance. An example of case vz=0 is to be considered below. For other values of vz, the operation of the device is similar.

At a given vehicle velocity v_actual (initial velocity), the stopping distance may be calculated by two-fold integration of the braking deceleration. Conversely, conversion unit 20 is able to use the stopping distance given by s_setpoint to calculate the braking deceleration which is necessary to maintain the stopping distance. First, a constant braking deceleration may be assumed as an idealized assumption. The resulting setpoint braking deceleration may then be used in different ways in conversion unit 20. First, by comparing the setpoint braking deceleration with prevailing braking deceleration a_actual, a brake pressure signal Pi may be generated, serving to regulate the braking deceleration to the setpoint. The prerequisite for this is that the actual braking deceleration may be determined with sufficient accuracy. This algorithm is therefore preferably used at higher vehicle velocities. Through this regulation, the vehicle deceleration caused by the braking torque of the engine is automatically taken into account.

Second, on the basis of the calculated setpoint braking deceleration and on the basis of function Pi(ai) supplied by monitoring block 34, brake pressure Pi which yields the desired setpoint braking deceleration for the wheel in question may be sought. In this case, the brake pressure is controlled, not regulated. Wheel-specific function Pi(ai) also takes into account the condition of the brakes, e.g., the nature of the brake pads, the effect of temperature and moisture and the like. Since this control does not depend on the measured braking deceleration, this control may be executed even at lower vehicle velocities, down to a complete standstill. At a vehicle standstill, conversion unit 20 sets brake pressure Pi at a value sufficient to keep the vehicle at a standstill.

Figure 2:
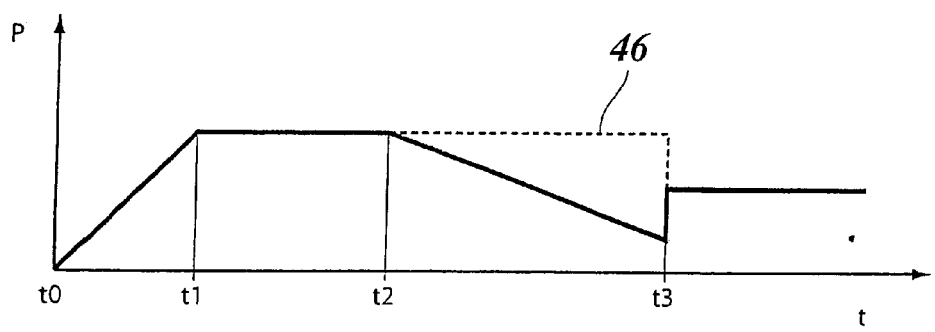
FIG. 2 shows an example of the curve of the brake pressure signal over time.

In conversion unit 20, instead of a constant braking deceleration, a braking deceleration which varies according to a certain time function may also be used as the basis, where the condition that the stopping distance obtained by integration of the braking deceleration is equal to s_setpoint is always to be maintained. FIG. 2 shows an example of such a time function. The braking deceleration there is represented by associated brake pressure P. At point in time to, the brake request signal is output by driver assistance system 10 for the first time. The brake pressure and braking deceleration are then ramped up gradually at a certain rate until point in time t1, then kept constant until point in time t2 and next reduced gradually again with a certain ramp until the vehicle comes to a standstill at point in time t3. The brake pressure is then set at a slightly higher constant value so that the vehicle is kept at a standstill. Due to the ramped-up change in brake pressure, a gentle onset and decay of braking and therefore a high driving comfort are achieved. The falling ramp in particular between points in time t2 and t3 ensures softening for the stopping jolt when the vehicle comes to a standstill. The location of points in time t1 and t2 on the time axis is variable and is determined by a comfort parameter which is permanently programmed either in conversion unit 20 or is relayed by driver assistance system 10.

Figure 3:
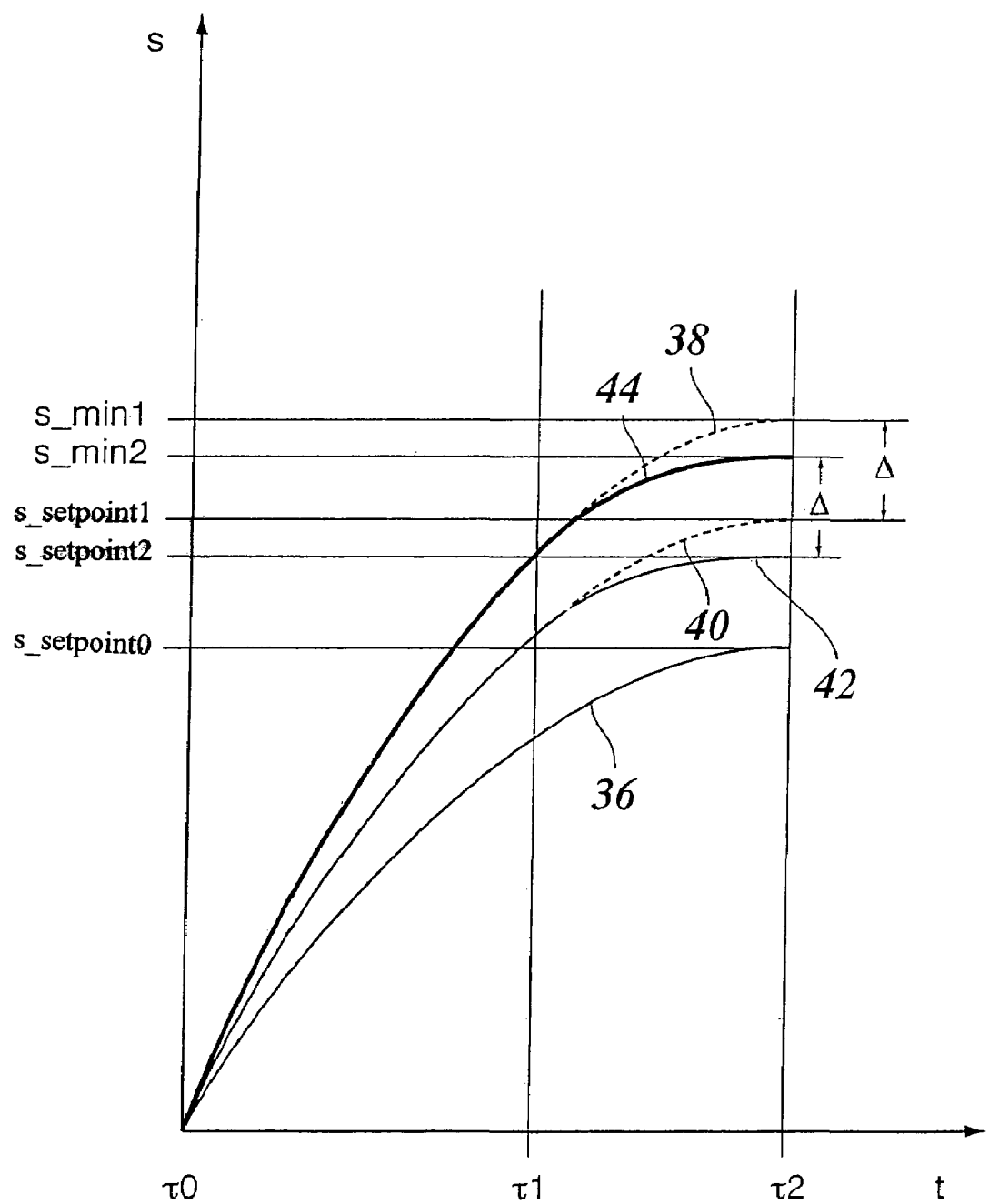
FIG. 3 shows a distance-time diagram to illustrate the adjustment of a braking request signal to the actual braking capacity.

The time function of the setpoint braking deceleration, represented by the curve in FIG. 2, may also be used as the basis for regulating the brake pressure in a closed-loop control circuit. The transition from regulating to controlling then takes place at a suitable point in time when the velocity of the vehicle has decreased to the point that the actual braking deceleration is no longer measurable with sufficient accuracy. At these low velocities, the contribution of engine torque to the braking deceleration is generally negligible. At velocities below the rolling velocity at which the vehicle would roll if the brake were released, the engine torque has an accelerating effect, i.e., in the sense of decreasing the braking deceleration. This effect is taken into account in the example shown here by function Pi(ai) but may optionally also be compensated by computer. Conversion unit 20 is able to predict anticipated stopping distance s_actual by integration from measured vehicle velocity v_actual and measured actual braking deceleration a_actual after which the vehicle will actually come to a standstill. This predicted stopping distance is reported back to driver assistance system 10 over interface 14. Instead of or in addition to predicted stopping distance s_actual, a minimum stopping distance s_min may also be output, i.e., the stopping distance required as a minimum at the maximum achievable braking deceleration. The parameters for determining the maximum braking deceleration (coefficient of friction of the roadway surface, etc.) are available as estimates at least in brake pressure regulators 21, and therefore the maximum braking deceleration is determinable on the basis of functions Pi(ai), for example. Distance signal s_setpoint is formed in driver assistance system 10 according to the base value method, so that it deviates from predicted stopping distance s_actual and/or minimum stopping distance s_min by no more than a certain tolerance value A. This is illustrated in FIG. 3. At point in time τ0, distance signal s_setpoint0 is output, and brake control unit 12 initiates the braking operation. The distance-time relationship corresponding to distance signal s_setpoint0 is represented by curve 36 in FIG. 3. It is now assumed that the required vehicle deceleration cannot be achieved because of more unfavorable conditions, e.g., because of an icy road surface. Conversion unit 20 therefore calculates a larger minimum stopping distance s_min1, which is represented by curve 38. Driver assistance system 10 then calculates a new distance signal s_setpoint1, which is smaller than s_min1 only by amount Δ. The particular distance-time relationship is represented by curve 40.

At point in time τ1, the vehicle should reach a section of roadway where the roadway surface again has better traction, so that a higher braking deceleration is achievable. If original distance signal s_setpoint0 had been retained, full braking would have been initiated at this point in time and driving comfort would suffer greatly. This effect is avoided here by changing the distance signal into s_setpoint1. Since the roadway now has better traction, conversion unit 20 calculates a shorter minimum stopping distance s_min2 after point in time τ1. Accordingly, the distance signal is now also reduced to distance s_setpoint2 which is shorter than s_min2 by amount Δ. The particular distance-time relationship is represented by curve 42. The vehicle is now decelerated at a somewhat greater rate and follows the distance-time relationship represented by curve 44, shown in bold, and thus comes to a standstill after predicted stopping distance s_min2. In this way, the circumstance that the traction of the road surface has increased again results in a shortening of the stopping distance from s_min1 to s_min2 but not in an uncomfortably sharp deceleration. Tolerance value Δ may be varied by driver assistance system 10, depending on the situation.

In FIG. 3 for the sake of simplicity it has been disregarded that the actual braking deceleration established in response to the brake request signal may be measured only with a certain time lag. Therefore in practice, a certain period of time will elapse between output of distance signal s_setpoint0 and the return message of predicted minimum stopping distance s_min1. The distance traveled by the vehicle in this period of time may be taken into account by computer, however.

The driver assistance system should of course provide great safety margins and the brake request signal should be output in such a timely manner that a certain lengthening of the stopping distance due to slick roads or the like is then acceptable and does not result in a crash. However, when the setpoint braking deceleration is calculated according to the time function shown in FIG. 2, there is still a certain tolerance that may be utilized to shorten the stopping distance. In other words, if a softening of jerky stopping and thus the ramped-up reduction in brake pressure between t2 and t3 is dispensed with, and instead, the maximum possible braking deceleration is maintained until point in time t3, which is shown with a dotted-line curve in FIG. 2, this yields a shorter stopping distance which may be reported back as s_min. Only when this tolerance has been exhausted is the setpoint stopping distance modified in the manner indicated in FIG. 3.

Driver assistance system 10 outputs a setpoint braking deceleration a_setpoint via deceleration interface 16. A regulating unit 48 uses wheel-brake decelerations ai calculated by converter 24 as feedback signals and adjusts brake pressures Pi via brake pressure regulator 21 so that the braking decelerations at the individual wheels are regulated to setpoint braking deceleration a_setpoint. This is of course possible only as long as the wheels are not blocking. If the antilock brake system is activated on a slick road surface, only a smaller braking deceleration a_actual may be achieved. This braking deceleration a_actual is reported back to the driver assistance system over deceleration interface 16 and, like the procedure illustrated in FIG. 3 (base value method), results in an adjustment of setpoint braking deceleration a_setpoint.

If interface selector 18 orders a change from distance interface 14 to deceleration interface 16, actual braking deceleration a_actual which is reported back is used to adjust initial setpoint braking deceleration a_setpoint at the prevailing actual value, so that a smooth transition is achieved.

In a modified embodiment, deceleration interface 16 may be replaced by a brake pressure interface over which a setpoint brake pressure is output to braking control unit 12 by driver assistance system 10. In braking control unit 12, this setpoint brake pressure is then modified using a vehicle-specific gain factor so that brake pressures P1 to be set by brake pressure regulators 21 on the individual wheels are obtained. The actual brake pressures on the individual wheels are then converted back to an actual brake pressure for the vehicle as a whole with the help of the gain factor, this brake pressure then being relayed back to driver assistance system 10 instead of actual braking deceleration a_actual.

In the example shown here, conversion unit 20 is integrated logically and physically into brake control unit 12 but it may optionally also be designed as an independent function unit or integrated into another system component, e.g., a drive train manager. This system component would then be part of brake control unit 12 in the sense of the present invention, despite the fact that it is independent logically and/or physically, and would then have to be adapted to the particular vehicle model, whereas driver assistance system 10 is independent of the vehicle model.

The functions of brake control unit 12 including conversion unit 20 may be used not only by driver assistance system 10 but also by other vehicle systems, e.g., by a collision avoidance system or crash mitigation system which operates independently of the driver assistance system and, if necessary, also overrides the actions controlled by the driver via the gas pedal and the brake pedal to prevent a collision or alleviate the consequences of an accident.

What is claimed is:

1. A device for longitudinal guidance of a motor vehicle, comprising:
    a driver assistance system which outputs a brake request signal to a brake control unit, the driver assistance system being configured to output the brake request signal in a form of a distance signal which specifies a distance to be traveled by the vehicle within which the vehicle is to reach a predefined target velocity;
    wherein:
        the brake control unit includes a conversion unit for converting the distance signal into a brake operation signal; and
        the conversion unit is configured to calculate a distance signal based on a measured actual braking deceleration and a vehicle velocity and report it back to the driver assistance system which specifies a predicted distance or a minimum distance required at a maximum achievable braking deceleration until reaching the target velocity.

2. The device as recited in claim 1, wherein the target velocity is predefinable by the driver assistance system.

3. The device as recited in claim 1, wherein the target velocity is zero.

4. The device as recited in claim 1, wherein the conversion unit is configured to convert the distance signal from the driver assistance system into a setpoint braking deceleration.

5. The device as recited in claim 4, wherein the conversion unit is configured to generate the brake operation signal in such a manner that the braking deceleration of the vehicle is regulated to the setpoint braking deceleration.

6. The device as recited in claim 4, wherein the conversion unit is configured to control the brake pressure acting on wheel brakes of the vehicle as a function of the setpoint braking deceleration.

7. The device as recited in claim 1, wherein the driver assistance system has a limiting function which limits possible values for the distance signal to be output so that the distance signal deviates from the reported distance signal by less than a predefined tolerance value.

8. A device for longitudinal guidance of a motor vehicle, comprising:
    a driver assistance system which outputs a brake request signal to a brake control unit, the driver assistance system being configured to output the brake request signal in a form of a distance signal which specifies a distance to be traveled by the vehicle within which the vehicle is to reach a predefined target velocity;
    wherein:
        the brake control unit includes a conversion unit for converting the distance signal into a brake operation signal; and
        the driver assistance system is configured to communicate with the brake control unit via a distance interface via which the distance signal can be output, and via another interface via which another brake request signal can be output, and the driver assistance system has an interface selector for selecting the interface to be used for output of the brake request signal.

9. The device as recited in claim 8, wherein the brake control unit is configured to generate a corresponding actual signal for the additional brake request signal and to report it back to the driver assistance system via the additional interface.

10. The device as recited in claim 9, wherein the driver assistance system has a limiting function which limits possible values for the output break request signal in the form of the distance signal to be output to the brake control unit to deviate from a distance signal reported by the brake control unit to the driver assistance unit by less than a predefined tolerance value.

11. The device as recited in claim 10, wherein the distance signal reported to the driver assistance unit is calculated by the break control unit based on the corresponding actual signal.

12. The device as recited in claim 9, wherein the conversion unit is configured to calculate another distance signal based on the corresponding actual signal and a vehicle velocity and report the another distance signal back to the driver assistance system which specifies a predicted distance or a minimum distance required at a maximum achievable braking deceleration until reaching the target velocity.

13. The device as recited in claim 8, wherein the target velocity is predefinable by the driver assistance system.

14. The device as recited in claim 8, wherein the target velocity is zero.

15. The device as recited in claim 8, wherein the conversion unit is configured to convert the distance signal from the driver assistance system into a setpoint braking deceleration.

16. The device as recited in claim 15, wherein the conversion unit is configured to generate the brake operation signal in such a manner that the braking deceleration of the vehicle is regulated to the setpoint braking deceleration.

17. The device as recited in claim 15, wherein the conversion unit is configured to control the brake pressure acting on wheel brakes of the vehicle as a function of the setpoint braking deceleration.

18. The device as recited in claim 8 wherein the driver assistance system has a limiting function which limits possible values for the output break request signal in the form of the distance signal to be output to the brake control unit to deviate from a distance signal reported by the brake control unit to the driver assistance unit by less than a predefined tolerance value.

19. The device as recited in claim 1, wherein the driver assistance system is configured to communicate with the brake control unit via a distance interface via which the brake request signal in the form of the distance signal can be output, and via another interface via which another brake request signal can be output, and the driver assistance system has an interface selector for selecting the interface to be used for output of the brake request signal.

* * * * *